United States Patent [19]

Pocholle et al.

[11] Patent Number: 5,086,433
[45] Date of Patent: Feb. 4, 1992

[54] STRUCTURE OF ILLUMINATION OF A LASER ROD WITH DELOCALIZED OPTICAL SOURCES

[75] Inventors: Jean-Paul Pocholle, Arpajon/la Norville; Michel Papuchon, Massy; Claude Puech, Ballainvilliers Longjumeau, all of France

[73] Assignee: Thomson-CSF, Puteaux, France

[21] Appl. No.: 536,523

[22] Filed: Jun. 12, 1990

[30] Foreign Application Priority Data

Jun. 23, 1989 [FR] France .................. 89 08384

[51] Int. Cl.$^5$ .............................................. H01S 3/093
[52] U.S. Cl. ................................ 372/72; 372/75; 372/99; 372/66
[58] Field of Search ............. 372/66, 71, 75, 99, 372/72

[56] References Cited

U.S. PATENT DOCUMENTS

| | | | |
|---|---|---|---|
| 4,555,786 | 11/1985 | Byer | 372/71 |
| 4,642,809 | 2/1987 | Petheram | 372/66 |
| 4,713,822 | 12/1987 | Lee | 372/75 |
| 4,794,615 | 12/1988 | Berger et al. | 372/75 |
| 4,949,346 | 8/1990 | Kuper et al. | 372/75 |

FOREIGN PATENT DOCUMENTS

| | | |
|---|---|---|
| 138411 | 4/1985 | European Pat. Off. . |
| 274223 | 7/1988 | European Pat. Off. . |
| 2844129 | 4/1980 | Fed. Rep. of Germany . |

OTHER PUBLICATIONS

Optics Letters, vol. 13, No. 3, Mar. 1988, pp. 204–206, M. K. Reed et al.: "Diode-Laser-Array-Pumped Neodymium Slab Oscillators,".
Applied Optics, vol. 26, No. 16, Aug. 15, 1987, pp. 3177–3179, K. Chan: "Multiple-Pass Laser-Diode-PUmped Nd:YAG Amplifier: Design."

Primary Examiner—William L. Sikes
Assistant Examiner—Susan S. Morse
Attorney, Agent, or Firm—Oblon, Spivak, McClelland, Maier & Neustadt

[57] ABSTRACT

The field of the invention is that of power lasers pumped by coherent optical sources, such as laser diodes. The aim of the invention is to provide a structure of illumination of a laser rod enabling both efficient removal of the calories released by the coherent optical pumping sources and high homogeneity of the rod pumping operations. The structure is characterized in that the optical sources of at least one set of optical sources are arranged on one and the same delocalized support and in that said structure comprises reflecting means for the transmission, towards the rod, of the illumination beam from said set of delocalized optical sources.

23 Claims, 4 Drawing Sheets

STRUCTURE OF ILLUMINATION OF A LASER ROD WITH DELOCALIZED OPTICAL SOURCES

BACKGROUND OF THE INVENTION

1. Field of the Invention

The field of the invention is that of power lasers pumped by coherent optical sources, such as laser diodes.

In the type of structure concerned by the invention, the mode used is a mode a transversal pumping of solid crystals in which rare earth ions are inserted, these ions being the site of the laser effect.

The use of resonant pumping by means of laser diodes has many advantages, among them the obtaining of greater efficiency of conversion of the electrical energy into optical energy and the reduction of the thermal effects at the rod to the minimum. However, the diode lasers used typically have optical/electrical conversion yields that do not exceed 50% in practice. The result thereof is that, in laser rod pumping operations, the unconverted electrical energy, which gets partly converted into heat at the junction of the laser diodes, has to be removed.

2. Description of the Prior Art

One configuration enabling the calories to be removed relies on the use of heat sinks forming the base of the emission strips. The level of energy that has to be removed is high when it is desired to make power lasers pumped with laser diodes. This, therefore, calls for the use of bulky heat sinks which then penalize the designer of the laser head particularly when the entire rod has to be pumped from strips distributed around it.

A known approach to this problem consists in delocalizing the pumping source (consisting for example of laser diodes) and using a multiple-mode optical fiber that conveys the pumping intensity towards the active medium.

However, this approach does not ensure the optimum homogeneity in the illumination of the laser rod, and further implies the use of discrete optical elements that are costly and complicate the mounting operation.

It is an aim of the invention to provide a new structure with delocalized optical pumping sources, overcoming these drawbacks.

More precisely, it is a first aim of the invention to provide a structure of illumination of a laser rod enabling both efficient discharge of the calories released by the coherent optical pumping sources and high homogeneity of the rod pumping operations.

Another aim of the invention is to provide an illumination structure enabling easy coupling, within one and the same assembly, of an oscillator module and an amplifier module.

An additional aim of the invention is to provide a structure that is capable of forming a rigid assembly that can be easily positioned and shifted, notably in the pumping cavity and/or with respect to an axis of amplification when the structure and the rod are used as amplifiers. This goal enables the laser emitter to be easily placed in specific configurations of operation or emission and also provides new functions of homogenization of the illumination of the rod, optimization of the rod in multiple-pass operations or again, for example, cooling of the rod by generation of a hydrodynamic flux.

SUMMARY OF THE INVENTION

These aims, as well as others which shall appear hereinafter, are achieved by means of a structure of illumination of a laser rod, notably for the pumping of the rod by means of at least one set of coherent optical sources, the optical sources of at least one set of optical sources being placed on one and the same delocalized support, said structure comprising reflecting means for the transmission, towards the rod, of the illumination beam from said set of delocalized optical sources.

According to the invention, said delocalized support is a heat sink, common to the sources of said set of optical sources.

The structure according to the invention has two main embodiments:

a first embodiment in which the sources of said set are distributed over an annular support, coaxial to the rod, said means for transmitting the illumination beam being formed by a truncated reflecting surface coaxial to said rod;

a second embodiment in which the sources of said set are distributed on at least one plane perpendicular to the axis of the rod (laser plate for example), said means for transmitting the illumination beam being formed by at least one reflecting, inclined plane surface.

In other words, the optical device for the transfer of the emission from the optical sources to the rod is formed by reflecting means, in the form of an either conical or prism-shaped block of glass or silica.

In the case of the second embodiment, with prismatic-type rod, the structure may be designed to cooperate, firstly, with a pair of reflectors forming a pumping cavity and, secondly, with means for the transmission in the rod, in at least one second pass, of the beam coming from said cavity. It is also possible to provide for the structure to comprise means for the translational shifting of said rigid assembly with respect to the pumping cavity, substantially in the plane of said rod.

In any case, it is advantageous that the support provided with the optical sources, the illumination beam transmission means and the rod form a rigid assembly, said assembly cooperating with a pair of reflectors forming a laser cavity.

In a specific embodiment of the invention, said rod is cut to the Brewster's angle, said assembly being inclined with respect to the axes of the reflectors of the pumping cavity.

In another specific embodiment, the structure cooperates with a control source and/or a longitudinal pumping laser diode.

According to the invention, it is also posssible to make a structure formed by two assemblies mounted upside down to each other, each assembly being formed by said support provided with optical sources, reflecting means for the transmission of the otical beam, and the rod, with the first oscillator forming an oscillator and the second assembly forming an amplifier.

In another specific embodiment of the invention, the structure has means for driving at least a part of the constituent elements of said structure in rotation around an axis of symmetry. Advantageously, said reflecting means for transmitting the illumination beam are mounted so as to be rotationally movable on at least one fixed support of said set of optical sources. In this case, said rod is preferably mounted so as to be preferably solidly fixed to said movable block. Said movable block may then also be designed so that it has means for the generation of a cooling hydrodynamic flux at the rod.

Other characteristics and advantages of the invention will appear from the following description of preferred embodiments of the invention, given as a non-restrictive illustration, and from the appended drawings, wherein:

DETAILED DESCRIPTION OF THE INVENTION

The figures show several embodiments of solid lasers pumped by laser diodes using an optical device for the transfer of the pumping towards the amplification medium, based on one and the same reflecting surface.

This configuration has the merit of bringing the pump laser diodes together on one and the same plate, and of moving them away from the medium that has to be pumped. This has the advantage of making it possible to deal with the thermal problems of the pump collectively. The monolithic aspect of the pair formed by the coupling optical device and the rod further makes it possible to envisage a number of alternative embodiments that are presented hereinafter.

Figure 1:
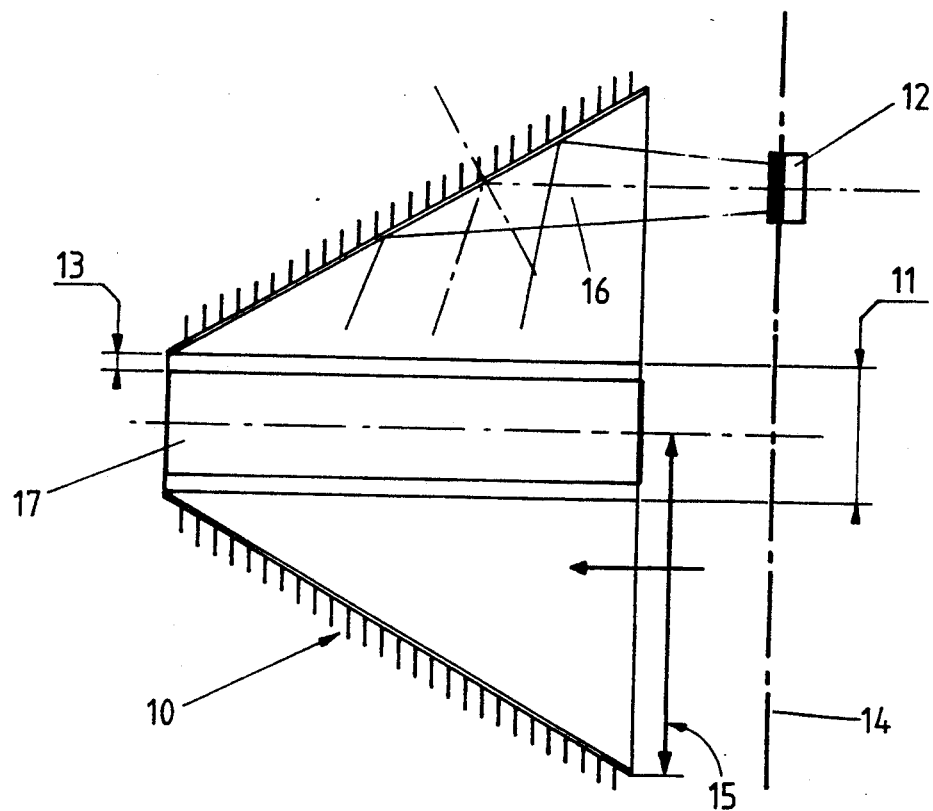
FIG. 1 shows a schematic sectional view of a truncated illumination structure according to the invention.

In the embodiment shown in FIG. 1, the implementation of the invention relies on the use of conical optical elements 10 pierced at their center 11. Each optical element 10 is advantageously made of a glass or silica material that is transparent to the wavelength of the pump beam emitted by the laser diodes 12 forming a pumping source. The central aperture 11 enables the insertion of a laser rod 17 and the set 13 existing between the rod 17, and the diameter of the hole 11 may be adjusted so as to enable the flow of a cooling liquid, the hydrodynamic rate of which can be controlled. A dielectric, multi-dielectric or metal coating on the conical part 10 enables the mirror function to be fulfilled. The pumping, in this case, is distributed on a plate 14 located in the vicinity of the widest cross-section 15 of the optical conical part 10 transferring the pump beams 16 to the laser rod. The laser diodes 12, localized on one and the same area 14, enable a specific treatment for the removal of the calories by using the cooling plate concept, and the diodes 12 are arranged in such a way that the pumping of the rod 17 has the optimum homogeneity.

Figure 2:
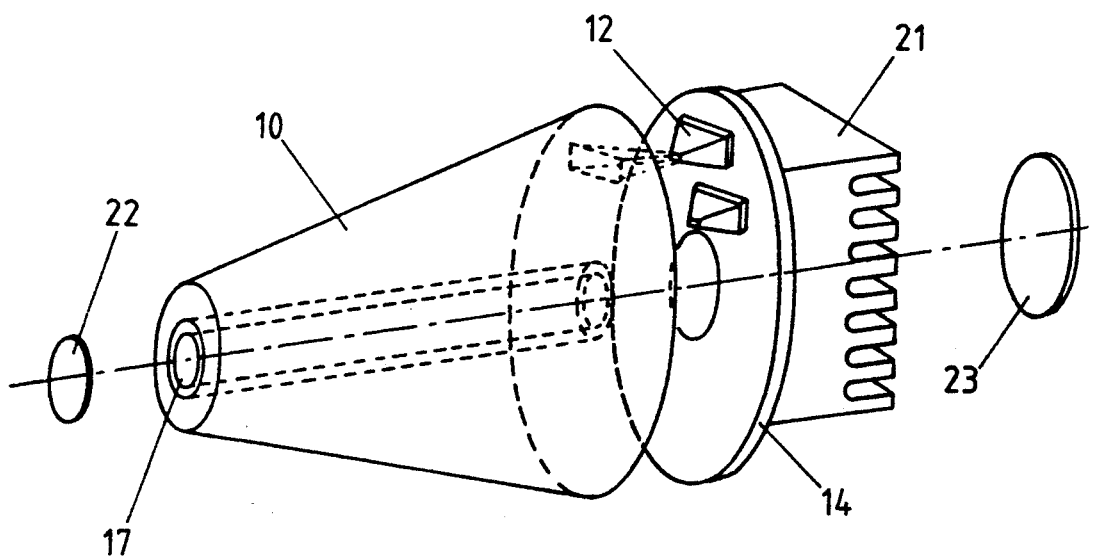
FIG. 2 shows a view in perspective of an oscillator including the illumination structure of FIG. 1 placed in a pumping cavity.

As shown in FIG. 2, the supporting plate 14 of the pumping diodes 12 is provided with a heat sink 21, two mirrors 22, 23 forming the pumping cavity. The pumping cavity is independent of the assembly formed by the support 14 provided with the optical sources 12, the reflector 10 and the rod 17. The truncated reflector 10 forms a coupling optical element common to the entire pump, and is inserted between the emitting plate formed by all the laser diodes 12 and the optical transfer part 10.

Figure 3:
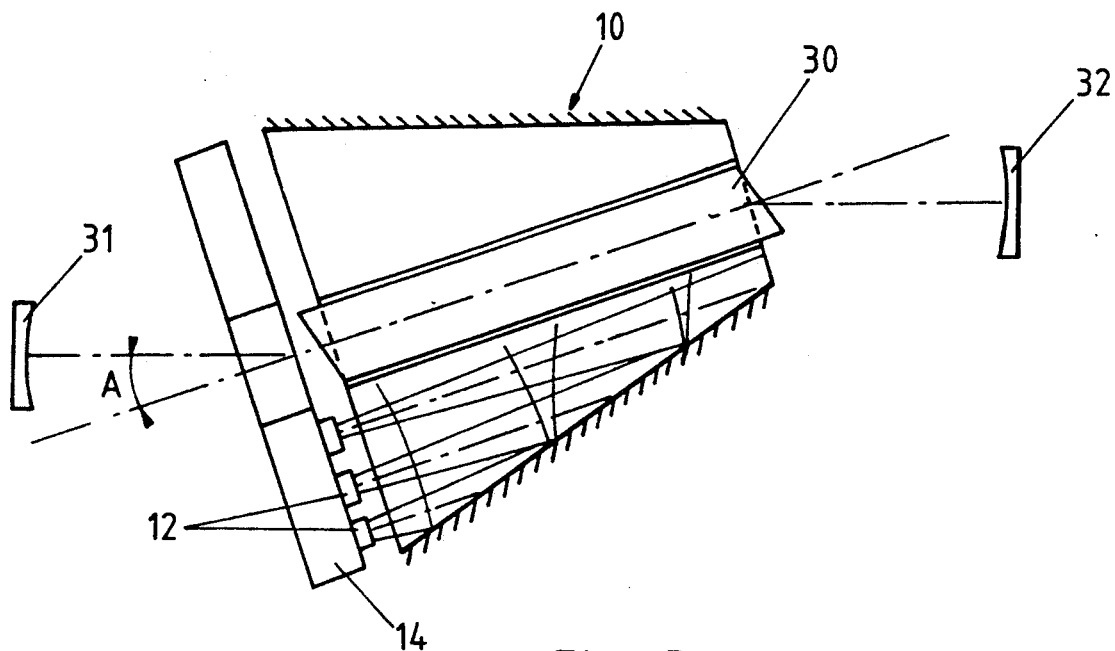
FIG. 3 illustrates the use of the invention in a "Brewster" configuration.

FIG. 3 illustrates a configuration adapted to the case represented by the use of a laser rod 30 cut to the Brewster's angle, in order to minimize the reflection losses on each diopter and control the polarization state of the optical wave generated in the rod 30. In this case, the rigid assembly 12+30+14+10 is tilted by an angle A between the mirrors 31, 32 of the laser cavity. The size of the optical coupling device has the particular geometry suited to the Brewster's configuration.

Figure 4:
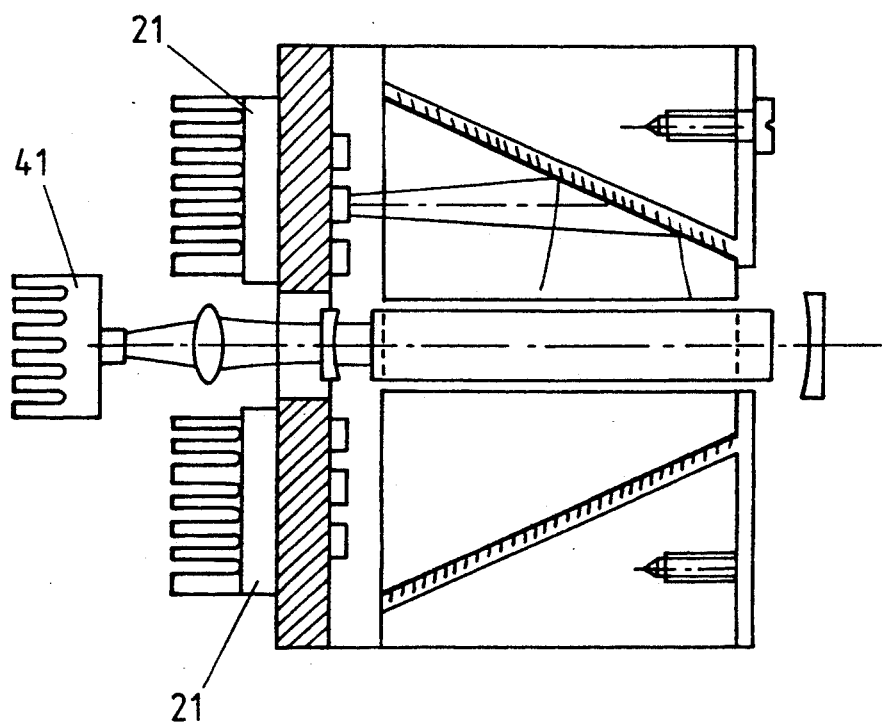
FIG. 4 shows a sectional view illustrating the use of a longitudinal pumping diode laser in combination with a truncated illumination structure according to the invention.

The configuration of the illumination structure of the invention may be used by means of a combined pumping mode. In this case, as shown in FIG. 4, a power laser diode 41 is coupled to one end of the rod. This diode carries out the longitudinal pumping and has a beam characteristic that is matched with that of the mode of the cavity in the part of the rod that is closest to it. This longitudinal pump may be used to initiate the population inversion or to increase the stability of the beam by imposing a gain profile, on a part of the rod, that gets matched with that of the mode of the cavity. If necessary, the laser diode 41 may be replaced by a ancillary laser (seeder) which has low power but is stable in frequency, for the injection of a control signal.

Figure 5:
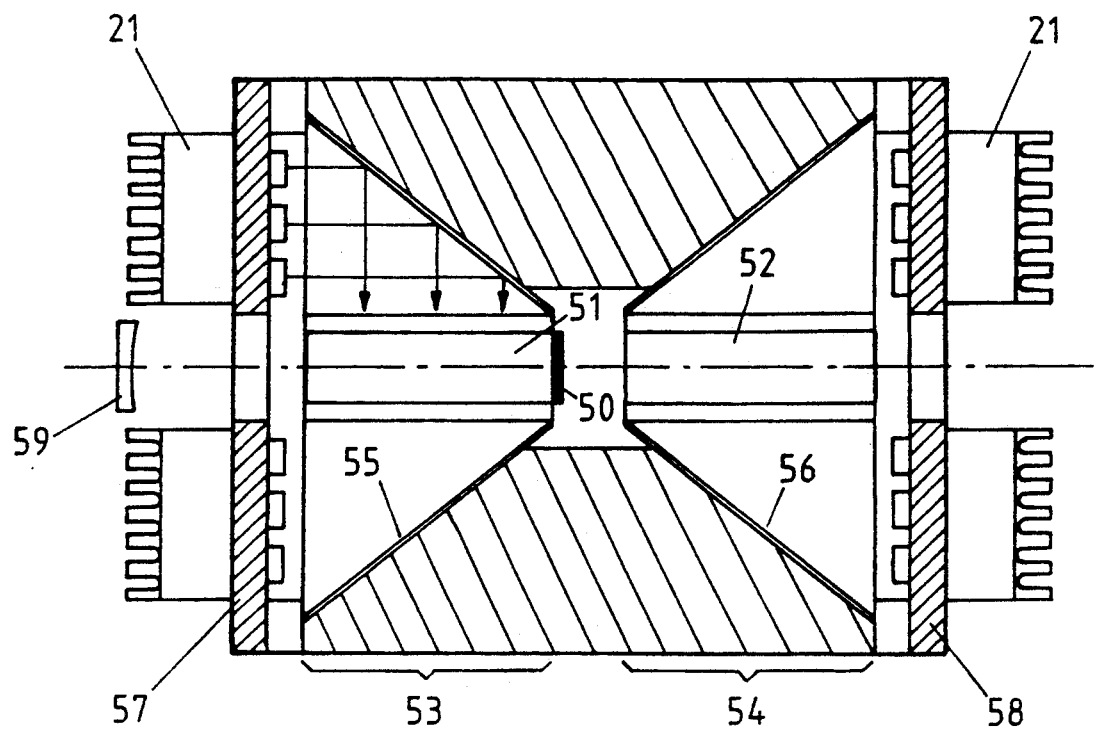
FIG. 5 represents the combination of two illumination structures according to the invention, to form an oscillator and an amplifier.
Figure 6:
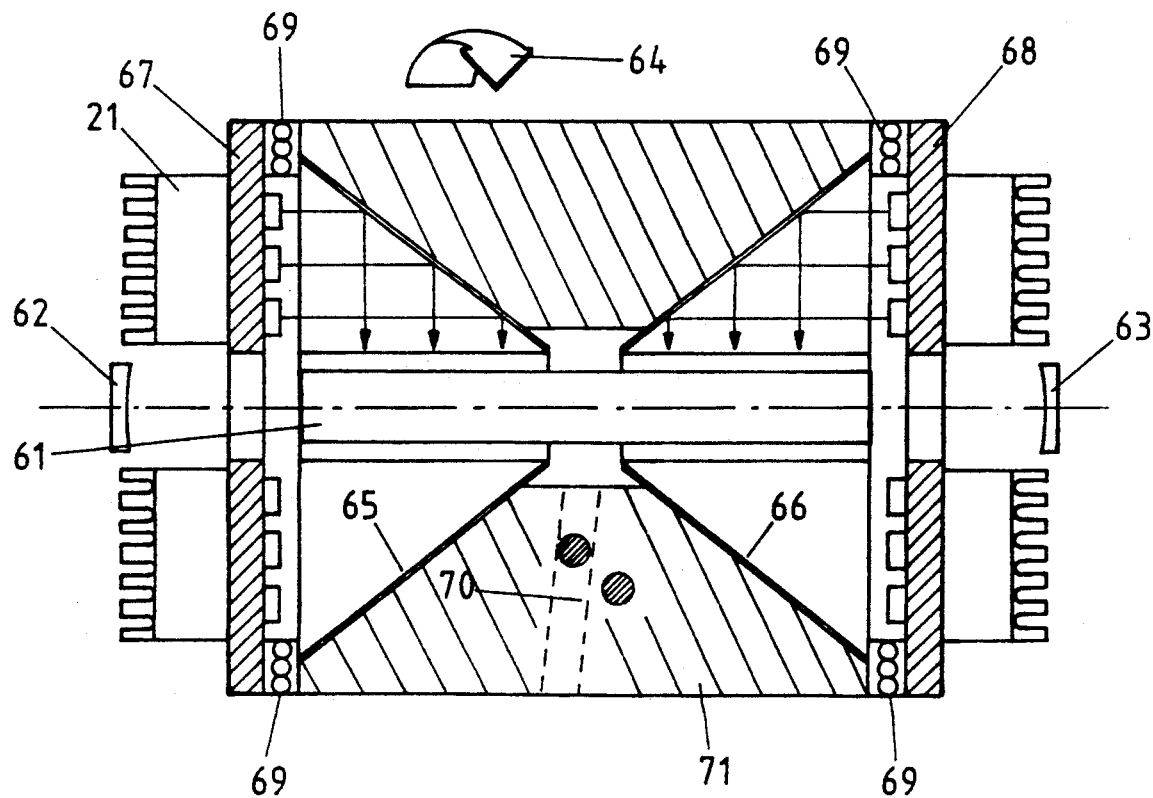
FIG. 6 shows a schematic view of an oscillator assembly with symmetrical pumping by means of two illumination structures according to the invention.

The association of two illumination structures enables the creation of an assembly formed by an oscillator 53 and an amplifier 54 (FIG. 5) or a single oscillator with a symmetrical pumping (FIG. 6).

The illumination structures 55, 56 are mounted upside down with respect to each other, as are the illumination structures 65, 66, so that the supporting plates 57, 58; 67, 68 of the optical sources are positioned at the ends of the assembly.

In the case of the assembly formed by the oscillator 53 and the amplifier 54 (FIG. 5), each of the modules 53, 54 is provided with a distinct laser 51, 52. The laser rod 51 of the oscillator is associated with a set of reflectors 50, 59 forming the laser cavity. The faces of the rod 52 are provided with antireflection coating.

In the embodiment of FIG. 6, the reflectors 62, 63 of the pumping cavity are located on either side of the rod 61. In this case, the source assembly having the character of a single piece (laser rod 61+coupling optical device 65, 66 of the pump) may be moved in a rotational motion 64. This putting of the rod into rotation enables homogeneity of the pumping to be obtained and may play a role facilitating the heat exchange and the cooling of the rod.

The rotation is permitted by mounting the rigid assembly on the two fixed supporting plates 67, 68 by means of ball bearings 69. The cooling is caused by a flux that goes through the internal cavity 60 and, for example, injection or removal nozzles 70 provided in the connecting structures 71 of the coupling optical devices 65, 66.

Figure 7:
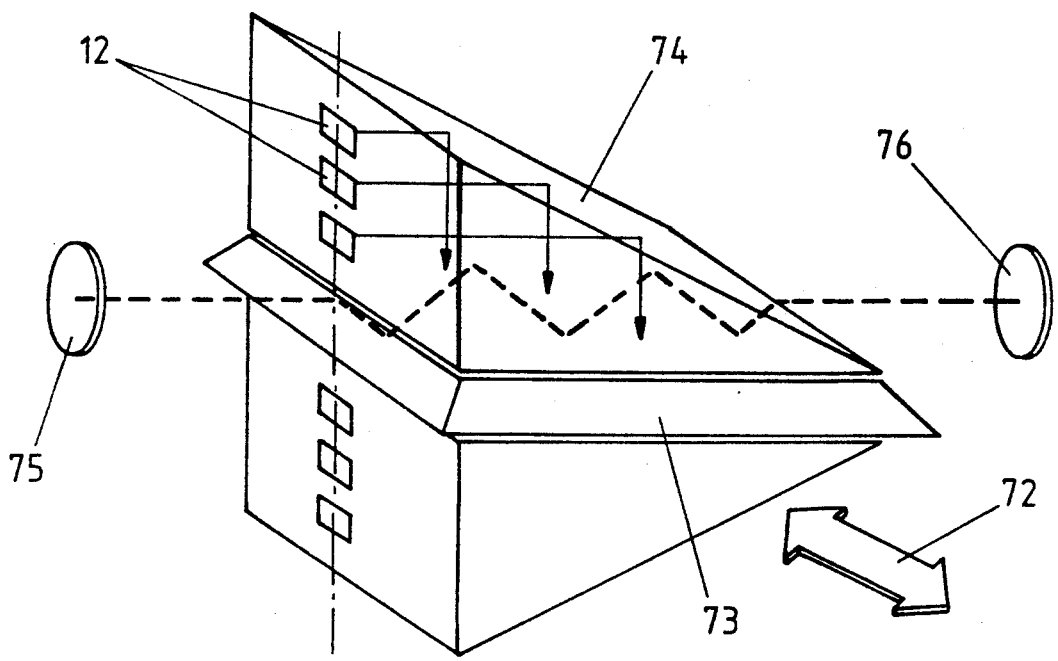
FIG. 7 shows an embodiment of a prismatic illumination structure according to the invention, with translational shifting with respect to the pumping cavity.

A plate configuration may also be envisaged to implement the invention, as shown in FIG. 7. In this case, the rotational motion may be replaced by a translation 72 of the laser plate 73 with respect to the optical transer device of the pump 74 and to the cavity defined between the two reflectors 75, 76, thus enabling the residual heat effects to be minimized. Only one condition governs the use of a shift such as this: it is necessary for the laser medium to be homogeneous and to have a cross-section with a dimension greater than that of the mode of the cavity.

Figure 8:
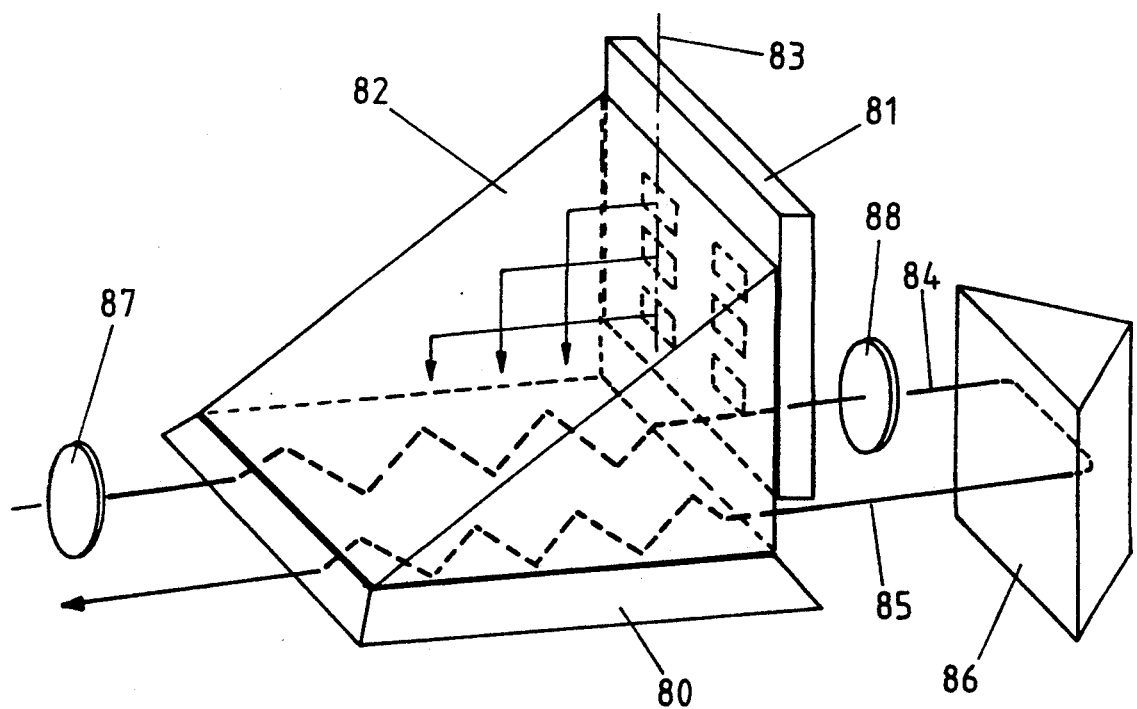
FIG. 8 illustrates an embodiment of a prismatic illumination structure according to the invention, with oscillator and amplifier conjugated in the same plate.

Finally, as illustrated in FIG. 8, the concept of an oscillator and amplifier integrated on one and the same plate 80 may be implemented by means of a distributed pumping transferred from a set of laser strips 83 placed on the pump plate 81 towards the laser medium 80 by means of a prismatic optical part 82.

Thus, a fist line 84 going through the plate 80 corresponds to the putting of the oscillator into resonance, between two reflectors 87, 88 and a second line 85, reflected by a reflector prism 86, corresponds to an amplification stage.

The choice of the slope characterizing the tilt of the diopter and, hence, the relationship of reflection and the propagation of the pump beams, as well as the optical transfer medium, characterized by its optical index, make it possible to achieve a distributed pumping mode that may be spatially selective.

What is claimed is:

1. A structure of illumination of a laser rod, notably for the pumping of the rod by means of at least one set of coherent optical sources, wherein the optical sources of at least one set of optical sources are placed on one and the same delocalized support, and wherein said structure comprises reflecting means for the transmission, towards the rod, of the illumination beam from said set of delocalized optical sources, and includes means for driving at least some of the constituent elements of said structure in rotation around an axis of symmetry.

2. A structure according to claim 1, wherein said delocalized support is a heat sink, common to the sources of said set of optical sources.

3. A structure according to either of the claims 1 or 2, wherein the sources of said set are distributed over an annular support, coaxial to the rod, said means for transmitting the illumination beam being formed by a truncated reflecting surface coaxial to said rod.

4. A structure according to either of the claims 1 or 2, wherein the sources of said set are distributed on at least one plane perpendicular to the axis of a laser plate, and wherein said means for transmitting the illumination beam are formed by at least one reflecting, inclined plane surface.

5. A structure according to claim 4, wherein the support provided with the optical sources, the illumination beam transmission means and the rod form a rigid assembly, said assembly cooperating with a pair of reflectors forming a laser cavity.

6. A structure according to claim 5, wherein said rod is cut to the Brewster's angle, said assembly being inclined with respect to the axes of the reflectors of the pumping cavity.

7. A structure according to claim 5, further comprising a control source for controlling the power to said at least one set of coherent optical sources and/or a longitudinal pumping laser diode for providing illumination to the laser rod.

8. A structure according to claim 1, wherein the structure is formed by two axially symmetric assemblies, mounted so their symmetric axes are colinear, each assembly being formed by its own delocalized support provided with a set of the optical sources, reflecting means for the transmission of the illumination beam, and the rod.

9. A structure according to claim 8, wherein a first assembly includes an oscillator and a second assembly includes an amplifier.

10. A structure according to claim 9, wherein the two assemblies are arranged to provide symmetrical pumping to the oscillator rod.

11. A structure according to claim 1, wherein said reflecting means for transmitting the illumination beam are mounted so as to be rotationally movable on at least one fixed support of said set of optical sources.

12. A structure according to claim 11, wherein said movable block includes means for the generation of a cooling hydrodynamic flux at the rod.

13. A structure according to claim 12, wherein said rod is mounted so as to be fixedly joined to said movable block.

14. A structure according to claim 4, cooperating, firstly, with a pair of reflectors forming a pumping cavity and, secondly, with means for the transmission in the rod, in at least one second pass, of the beam coming from said cavity.

15. A structure according to claim 5, including means for the translational shifting of said rigid assembly with respect to the pumping cavity, substantially in the plane of said rod.

16. A structure according to claim 1, wherein said optical sources are formed by laser diodes.

17. A structure according to claim 1, wherein said reflecting means for the transmission, towards the rod, of the illumination beam from said set of delocalized optical sources, are formed by a mirror with dielectric and/or metal coating.

18. A structure of illumination of a laser rod, notably for the pumping of the rod, comprising:
    at least one set of coherent optical sources distributed over an annular support, said support coaxial to the rod; and
    means for transmitting an illumination beam produced by said optical sources being formed by a truncated reflecting surface coaxial to said rod.

19. A structure according to claim 18, including means for driving at least a part of the constituent elements of said structure in rotation around an axis of symmetry.

20. A structure according to claim 19, wherein said reflecting means for transmitting the illumination beam are mounted as part of a movable block so as to be rotationally movable on at least one fixed support of said set of optical sources.

21. A structure according to claim 20, wherein said movable block includes means for the generation of a cooling hydrodynamic flux at the rod.

22. A structure according to claim 21, wherein said rod is mounted so as to be fixedly joined to said movable block.

23. A structure according to claim 18, wherein the support provided with the optical sources, the illumination beam, the transmission means and the rod form a rigid assembly and wherein means for the translational shifting of said rigid assembly with respect to the pumping cavity, are substantially in a plane including the axis of said rod.

* * * * *